United States Patent [19]

Ekman

[11] 3,936,079
[45] Feb. 3, 1976

[54] COUPLING OR JOINTING UNIT

[76] Inventor: Bror Thure Fridolf Ekman, Slalomvagen 12, S-541 00 Skovde, Sweden

[22] Filed: July 5, 1974

[21] Appl. No.: 485,950

[52] U.S. Cl. .................. 285/98; 285/175; 285/351; 285/370
[51] Int. Cl.² ..................... F16L 17/02; F16L 17/06
[58] Field of Search .......... 285/351, 105, 279, 281, 285/305, 354, 370, 175, 168, 98, 279, 280, 275, 278, 272; 277/64, 58

[56] References Cited
UNITED STATES PATENTS

| | | | |
|---|---|---|---|
| 1,163,995 | 12/1915 | Frank | 285/279 |
| 2,305,725 | 12/1942 | Meyer | 285/281 |
| 2,331,615 | 10/1943 | Meyer | 285/281 X |
| 2,395,861 | 3/1946 | Fraser | 285/279 X |
| 3,510,155 | 5/1970 | Jacobus | 285/98 |

FOREIGN PATENTS OR APPLICATIONS

| | | | |
|---|---|---|---|
| 131,341 | 8/1919 | United Kingdom | 277/58 |

*Primary Examiner*—Werner H. Schroeder
*Assistant Examiner*—Moshe I. Cohen
*Attorney, Agent, or Firm*—Burns, Doane, Swecker & Mathis

[57] ABSTRACT

A coupling unit insertable between a first and a second pipeline, flexible or hose pipe or the like. Said coupling unit allows relative movement between the pipelines and comprises an outer part or conduit member serving as a muff and attachable to the first pipeline. A suitably tubular shaped inner part or conduit member is attachable at its one end, attachable to the second pipeline and at its other end carries a first surface, which by coaction with a second surface inside the outer part can limit a separating movement of the parts. A sealing device is arranged to prevent the medium in the pipeline from leaking between the parts. The sealing device comprises first sealing means coming into action when the inner part at said surfaces is pressed towards the outer part at a given pressure in the medium. The sealing device further includes a second sealing means placed behind the first sealing means. Said second sealing means being arranged resiliently in the axial direction of the parts for momentary high pressures occurring in the medium and passing the first sealing means.

7 Claims, 3 Drawing Figures

COUPLING OR JOINTING UNIT

FIELD OF THE INVENTION

The present invention is primarily intended to be used for pipelines, flexible pipes, hose pipes or the like, and relates in particular to a coupling unit for insertion between a first and a second pipeline to permit relative movement between the pipelines.

DESCRIPTION OF THE PRIOR ART

Coupling units are known which comprise an outer part, serving as a muff and attachable to the first pipeline, a tubular inner part, one end of which is adapted for attachment to the second pipeline, and the other end having a first surface which, by engagement with a second surface inside the outer part, can limit the separating movement of the parts, and a sealing device for preventing leakage of medium from the pipelines.

While the following discussion primarily deals with the invention in conjunction with problems occurring in a hydraulic system, this does not exclude the use of the invention in other fields where corresponding problems occur, and where other than a hydraulic medium is employed.

The coupling unit according to the present invention is particularly useful in hydraulics, amongst other things, for making possible the transference of pressure to power converting means, where there is the requirement of arranging hydraulic pipelines at movable booms, rods, links etc., e.g., for different kinds of working machines, industrial machines, etc. In this connection it is of great importance that the coupling unit permits common displacement and twisting movement so that the stresses in the pipelines and their unions are limited. As a result of this it is necessary that, for example, the inner portion can make certain sliding movements along and twisting movements about its centre line.

Due to the high pressure of up to 300 kiloponds/cm$^2$ and more which is generally used in the pipelines, it has been found difficult to retain relative movability in coupling units known earlier, especially in the upper pressure range, which has meant that large torsion and tension stresses have, amongst other things, resulted in the unions of the coupling units to the pipelines. It has furthermore been found difficult to obtain satisfactory sealing between the parts, which has caused considerable leakage in the previously known coupling units, after a period of use.

OBJECTS OF THE PRESENT INVENTION

An object of the present invention is to provide a coupling unit which solves the above-mentioned problem and which retains the desired turning ability between the parts while resisting considerable momentary pressure impulses over the whole of the pressure range. Another object of the invention is to provide a coupling unit which, in addition to having good functional qualities, is of a simple construction requiring comparatively few parts.

According to the present invention, in a coupling unit of the kind described above, the sealing device comprises first sealing means arranged for effecting sealing when the inner part, at said surfaces, is pressed towards the outer part at a given pressure of the medium, and second sealing means located to be downstream of the first sealing means for effecting sealing if pressure occurs in the medium and passes the first sealing means, said second sealing means being arranged to be resilient in the axial direction of the parts and thereby yield to effect sealing in the event of high pressures.

BRIEF DESCRIPTION OF THE DRAWINGS

In order that the invention may be readily understood one embodiment of a coupling unit in accordance therewith will now be described by way of example, with reference to the accompanying drawing where.

DESCRIPTION OF THE PREFERRED EMBODIMENT

Figure 1:
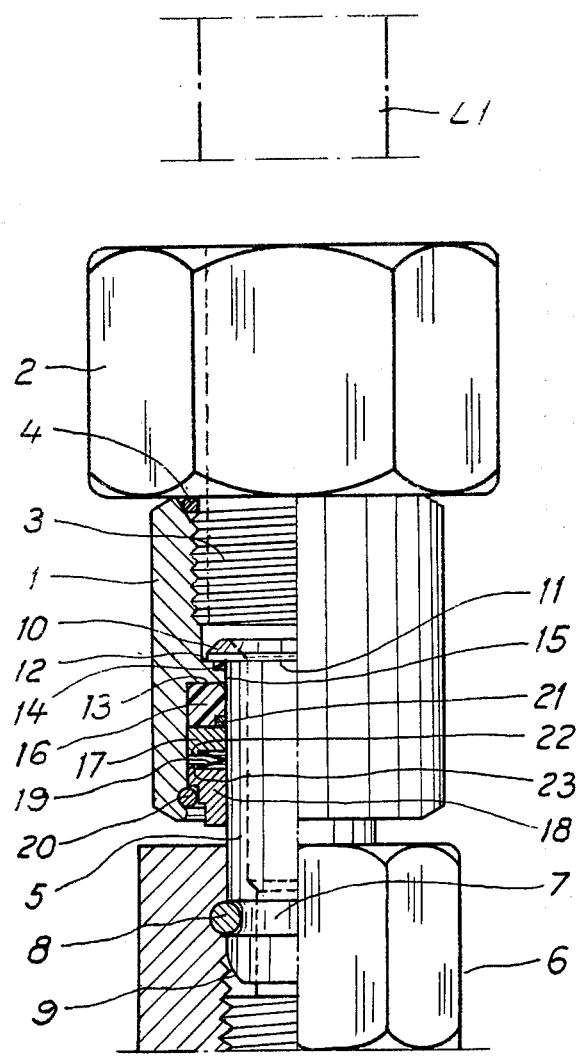
FIG. 1 shows a vertical elevation and a partial cross-section of a unit.

In the Figures an outer part or conduit member designated with the numeral 1 serves as a muff and is attachable to a first or conduit element or hydraulic pipeline, as a flexible or hose pipe or the like, symbolically shown by L1. The outer part is attachable to the first pipeline via an attaching union provided with a hexagonal nut 2 and a threaded portion 3, on which the outer part is screwed fast by a thread provided in it, and sealed with a sealing ring 4. The attaching union used may be a standard component having a ¾ inch thread for example. The attaching union is made with a through bore, and attachment to the first pipeline is via the hexagonal nut.

The coupling unit also includes a suitably shaped conduit member or tubular part 5, attachable via its one end to a second conduit element, as a pipeline, flexible or hose, pipe or the like, symbolically shown by L2. Attachment is made to an attaching union 6 (a nut) which in its turn is connectible to said second pipeline. The attaching union 6 is provided with a recess corresponding to the shape of the one end of the conduit member or inner part 5. The inner part is made with a peripheral groove 7 directly opposite a groove in part 6. Said grooves coincide to form a closed channel, continuing tangentially to the outside of part 6, so that a locking wire can be driven into said channel from the outer surface of part 6 to form a locking ring 8. Parts 5 and 6 also have through bores through them so that the pipelines joined to the coupling unit are internally connected with each other. The seal at parts 5 and 6 is obtained through a conically or spherically shaped portion 9 at the one end of part 5, which portion 9 co-acts with a corresponding surface on a part, not shown, which can be screwed home in nut 6.

At its other end, the inner part 5 is provided with a projecting flange 10, having on its lower side a first surface 11, engagable with a second surface 12, on the inside of the outer part. Said second surface 12 is situated on the upper side of an inwardly directed flange 13. On said upper side of the inwardly directed flange there is a recess for the first sealing means in the form of a ring 14. The inwardly directed flange also carries a guiding surface 15 for the inner part. The first sealing ring 14 is made of a material having a low coefficient of friction and high wearing strength. The material can be some suitable plastic, e.g., polyacetal, polyamide, etc. The first sealing ring 14 coacts with a portion of the lower side of the flange provided on the inner part 5, when the inner part is pressed towards the second surface 12. In a non-actuated position first sealing ring 14 projects somewhat above second surface 12 as in FIG. 3, as about 0.20–0.5 mm. The recess can limit the compression of the first sealing ring in some cases.

A second sealing means in the form of a ring 16 is applied to the lower side of the inwardly directed flange, and consists of a sealing element known per se, and made of silicon rubber, polyurethane, etc. In the shown embodiment, the second sealing means is provided with an essentially quadratic or rectangular cross-section, but naturally other cross-sectional configurations are usuable in this application.

The second sealing means is continuously acted on by a spring means, comprising an upper metal ring 17, bearing against the second sealing means, a lower metal ring 18 fixedly positioned in relation to the outer part 1, and spring washers 19 known per se placed between said rings, the washers 19 being two in number in the present embodiment. The lower ring 18 can be fixed relative to the outer part 1 with a wire in a way corresponding to the fixation of parts 5 and 6 to each other, the locking ring thus formed in this case has been given the reference number 20. The second sealing ring 16 is provided on its inside with a third sealing ring 21, coacting with the upper inner surface of said metal ring 17. Third sealing ring 21 is made in a stronger material than the rest of the second sealing ring 16, e.g., polyacetal of polyamide. The upper and lower metal rings are provided with ridges 22 and 23, respectively, directed towards each other, said ridges being designed to limit the maximum spring compression movement of the means, thereby protecting the spring washers 19 against mechanical overload. The spring washers are guided via their peripheries and the inner diameters of the washers exceed the outer diameter of part 5 with a good margin.

The pressure used in the hydraulic pipelines, flexible or hose pipes or the like, is here assumed to vary between $0 - 300$ kp/cm². the inner part thereby having its flange made to give a surface exposed to the pressure in the medium causing the inner part normally to be pressed towards the second surface 12 and the first sealing ring 14 at a pressure of between 5 and 10 kp/cm², so that the latter comes into operation and prevents the pressure spreading downwards to the second sealing means. However, if the inner part takes up a position (caused by outer forces on the pipeline L2) where the first sealing ring 14 is not actuated (see FIG. 3), and if a momentary pressure is occurring, the inner part cannot manage to close the passage to the second sealing means 16 immediately by means of first sealing ring 14, and at least a part of said momentary pressure will be spread to the second sealing means 16. If the momentary pressure then is high, the second sealing means will more or less yield axially, due to the spring means. When the pressure diminishes and the passage at the first sealing ring is reopened, due to the inner part altering its axial position, the spring means will move back again.

Figure 2:
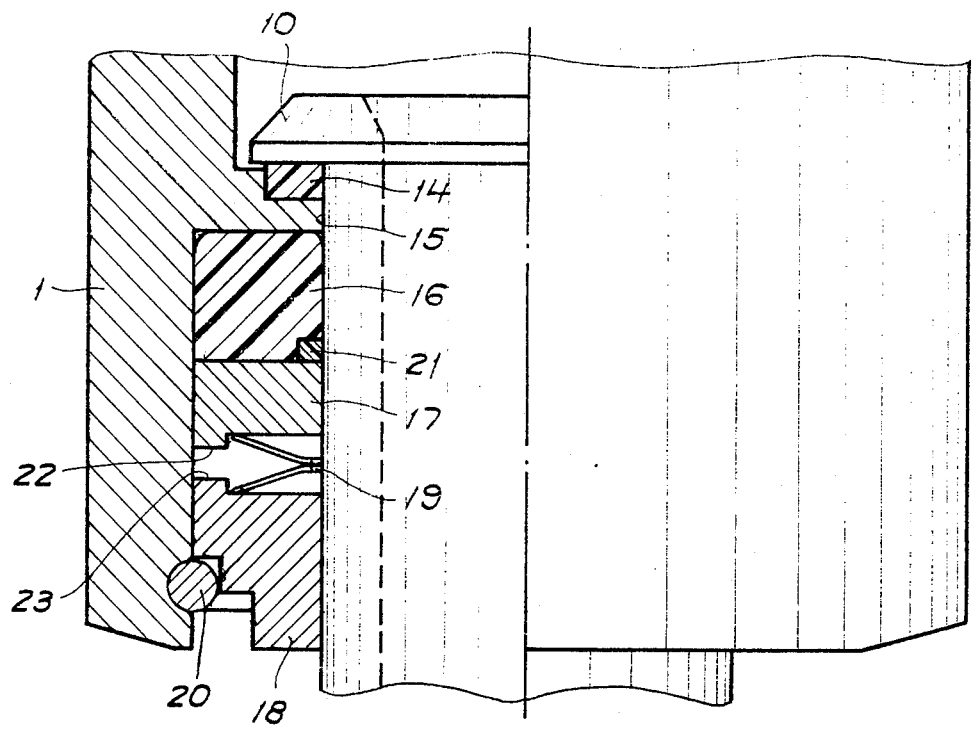
FIG. 2 shows in an enlarged scale parts of the unit according to FIG. 1 in a first position, corresponding to the position shown in FIG. 1
Figure 3:
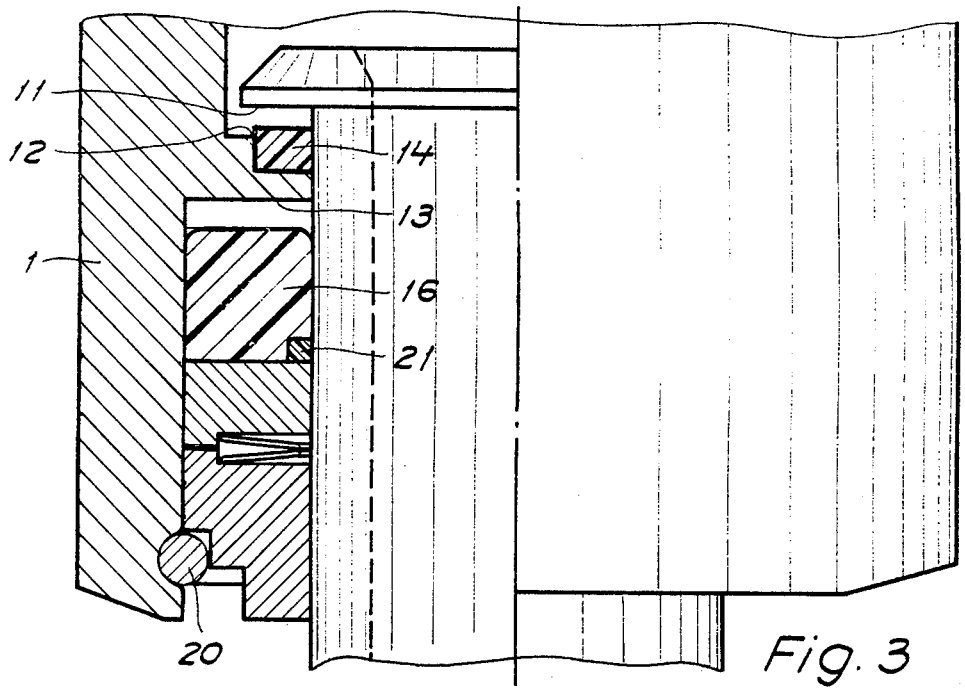
FIG. 3 shows the parts in FIG. 2 in a second position.

FIG. 2 shows the same position for the part 5 as FIG. 1 does. FIG. 3 shows the case in which a comparatively very high momentary pressure is occuring in the medium and the part 5 by outer forces on said second line L2 is pressed inwards so the sealing ring 14 is non-activated. Said high pressure is assumed to enable the spring means so ridges 22 and 23 contact each other before the part 5 by said high pressure is forced against the surface 12 and the sealing ring 14 is activated.

When said high pressure disappears, compensation of pressure can take place as soon as the part 5 moves axially and thereby cause spring means to move back again, and so on. The maximum resilient movement of the washers is about 1.2 mm in this particular embodiment. A certain resilient movement will also take place the second sealing ring 16 in itself. The conditions of the coupling unit in practice should be such that said maximum movement seldom will be used. From a general point of view it seems to be suitable to use maximum resilient movements of 1–2 mm.

Through the illustrated construction, an effective seal is obtained which is also gentle towards the sealing means, even at high momentary pressures arising in the system. Furthermore, continuous lubrication by the oil in the system is obtained for the portions coacting with the surfaces of the inner part, which means reduced wear and facilitation of rotatability of the inner part in the outer part, or vice versa.

Practical tests have shown that the desired rotatability between the parts is obtained even within the high pressure range, which depends on the fact that said parts 1 and 5 do not become jammed against each other via the second sealing ring 16.

Assembling the coupling unit itself becomes extremely simple thanks to the few components which are simple to put together. The first sealing ring 14 and the inner coupling member or part 5 are first mounted on outer coupling member or part 1 which is thereafter attached to portion 3 and nut 2. Next, the second sealing ring 16 with associated ring 21 are assembled in place, followed by the metal ring 17, spring washers and metal ring 18, whereafter the latter is fixed in position relative to the outer part 1 by locking ring wire 20, and part 6 is fixed relative to part 5 in a corresponding manner by locking ring wire 8.

The invention is not limited to the embodiment illustrated above, which is only an example, and may be subjected to modifications within the scope of the following claims. The engagement and bearing surfaces can for example be varied without departing from the scope of the invention, the same thing applying to the design and positioning of the seals and the spring means. Neither is the inner part tied against the illustrated tubular form.

What is claimed is:

1. A coupling for joining conduit elements subject to relative swiveling movements comprising:
   an outer conduit member including an end portion adapted to engage one conduit element and a radially inwardly extending flange displaced from said end portion for providing a first annular surface,
   an inner conduit member including an end portion adapted to extend through said outer conduit member and an opposite end portion with a radially outwardly extending flange providing a second annular surface facing said first annular surface and capable of limiting the movement of said inner conduit member relative to said outer conduit member,
   a first sealing ring of low friction material between said annular surfaces for sealing said conduit members against fluid leakage when said surfaces are urged toward each other by a predetermined pressure acting on the radially outwardly extending flange of the inner conduit member and resulting from the fluid pressure and external forces on the conduit members, an annular sealing compartment being defined between the inner surface of said outer conduit member and the outer surface of said inner conduit member in the leakage path between said conduit members downstream of said first sealing ring, and
sealing means in said compartment including a second sealing ring backed up by axially resilient spring means, said second sealing ring normally sealing said passage against leakage at fluid pressures less than said predetermined pressure and said spring means acting to absorb energy upon imposition to the second sealing ring of fluid pressure exceeding said predetermined pressure to allow the second sealing ring to seal said passage without causing binding of said conduit members together when the facing surfaces of said members are displaced from sealing position due to external forces exerted on the conduit members.

2. A coupling as defined in claim 1 wherein the first sealing ring is of a firm material requiring a relatively high pressure for deformation and the second sealing ring is of a less firm material deformable by a substantially lower pressure.

3. A coupling as defined in claim 1 wherein said annular sealing compartment is defined at its upstream end by the side of said flange on said outer conduit member opposite said first annular surface, and said sealing means in said compartment includes a first ring fixed relative to said outer conduit member, a second ring engaging the downstream side of said second sealing ring, and said axially resilient spring means constitutes spring washers disposed between said rings to bias said second sealing ring toward said oppostie side of said flange on said outer conduit member.

4. A coupling as defined in claim 1 wherein said first annular surface is provided with an annular groove for receiving said sealing ring, the depth of said groove being less than the depth of said sealing ring.

5. A coupling for joining conduit elements subject to relative lateral and swiveling movements comprising:
an outer conduit member including an end portion adapted to engage a conduit element and an inner flange spaced from said end portion for providing a first annular surface,
an inner conduit member including an end portion adapted to extend through said outer conduit member for engagement with a second conduit element and an opposite end portion with an outwardly extending flange providing a second annular surface facing said first annular surface and capable of limiting movement of said inner member relative to said outer conduit member,
a first sealing ring of low friction material between said annular surfaces for sealing the fluid leakage path when said surfaces are urged toward each other with at least a predetermined pressure,
an annular sealing compartment being defined between the inner surface of said outer conduit member and the outer surface of said inner conduit member downstream of said first sealing ring,
a second sealing ring operable at a lower pressure than said first sealing ring in said annular sealing compartment,
a first additional ring in said annular sealing compartment downstream of said second sealing ring,
a second additional ring in said sealing compartment downstream of said first additional ring in a relatively fixed position to said outer member,
spring washer biasing means between said rings,
and means on at least one of said additional rings projecting toward the other of said additional rings for limiting the maximum compression of said spring washer means.

6. A coupling as defined in claim 5 wherein said spring washer biasing means comprises at least two oppositely biased spring washers, and said means for limiting compression of the spring washer means includes opposed ridges on said additional rings.

7. A coupling as recited in claim 5 wherein an end wall of said sealing compartment is defined by a surface of the flange of said outer conduit member opposite said first annular surface.

* * * * *